United States Patent [19]

Fredriksson

[11] 4,187,344

[45] Feb. 5, 1980

[54] PROTECTIVE SILICON NITRIDE OR SILICON OXYNITRIDE COATING FOR POROUS REFRACTORIES

[75] Inventor: John I. Fredriksson, Holden, Mass.

[73] Assignee: Norton Company, Worcester, Mass.

[21] Appl. No.: 946,337

[22] Filed: Sep. 27, 1978

[51] Int. Cl.$^2$ ............................................. B32B 9/04
[52] U.S. Cl. ................................. 428/304; 428/306; 428/331; 428/404; 428/446; 428/538
[58] Field of Search ............... 428/304, 306, 331, 404, 428/446, 538; 201/63

[56] References Cited

U.S. PATENT DOCUMENTS

| | | | |
|---|---|---|---|
| 1,114,665 | 10/1914 | Allen | 201/63 |
| 1,918,317 | 7/1933 | Benner | 201/63 |
| 2,992,127 | 7/1961 | Jones | 428/446 |
| 2,993,814 | 7/1961 | Epprecht | 201/63 |
| 3,248,346 | 4/1966 | Amberg | 201/63 |
| 3,531,678 | 9/1970 | Schiavone | 201/63 |
| 3,538,231 | 11/1970 | Newkirk | 201/63 |
| 3,895,219 | 7/1975 | Richerson | 428/446 |
| 3,911,188 | 10/1975 | Torti | 428/446 |

*Primary Examiner*—Marion E. McCamish
*Attorney, Agent, or Firm*—Arthur A. Loiselle, Jr.

[57] ABSTRACT

Porous refractory articles resistant to degradation at high temperatures for example by oxygen, chlorine and the like, are composed of a main body of a porous sintered carbide, nitride, boride or silicide which is coated with silicon nitride or silicon oxynitride. The coating is not only on the surface of the main body of the porous refractory article, but also penetrates the article to a depth at least greater than the depth of the surface pores.

6 Claims, No Drawings

PROTECTIVE SILICON NITRIDE OR SILICON OXYNITRIDE COATING FOR POROUS REFRACTORIES

TECHNICAL FIELD

The invention relates to porous refractory articles. More particularly, the invention relates to porous refractory articles including a non-porous protective coating thereon.

BACKGROUND ART

Prior Art Statement

The following patents are representative of the most relevant prior art known to the Applicant at the time of filing of the application:

| U.S. Pat. Nos. | | |
|---|---|---|
| 1,114,665 | October 20, 1914 | T. B. Allen et al |
| 1,918,317 | July 18, 1933 | R. C. Benner et al |
| 2,993,814 | July 25, 1961 | W. Epprecht et al |
| 3,248,346 | August 26, 1966 | S. Amberg |
| 3,531,678 | September 29, 1970 | F. J. Schiavone |
| 3,538,231 | November 3, 1970 | T. F. Newkirk et al |

The high temperature properties of metal borides, carbides, nitrides and silicides have been long recognized and utilized in high temperature environments in the form of kiln furniture, bricks, heating elements and the like. Early on in the commercial use of these materials their shortcomings were also recognized. When these materials were used at very high temperatures in the presence of molten metal, oxygen, chlorine or the like, these hostile environments reacted with the material causing deterioration. This occurrance is particularly severe in refractory heating elements such as silicon carbide heating elements.

Many attempts have been made to eliminate this deterioration of the base refractory material by coating the article with a substances or mixture of substance that were more resistant to deterioration than the refractory; these attempts have met with only marginal success.

The Allen et al patent listed above coats the refractory article with a glaze made up, in parts by weight, of 120 parts $SiO_2$, 18.6 parts $Na_2O$, 6.2 parts $MgO$, 28.2 parts $K_2O$, 19.9 parts $BaO$; this composition is applied to the refractory article and fired at 700° C. to vitrify the glaze. Another glaze utilizes a glaze of a different composition applied to silicon carbide resistors i.e. heating elements. Benner et al teaches the use of a glaze made up of an alkaline earth halide, a mixture of $TiO_2$ and $Al_2O_3$, $TiO_2$ and $CaO$, $CaF_2$ and bone ash, $Al_2O_3$ and $CaF_2$, or a mixture of $BaCl_2$, $CaF_2$ and $Na_3AlF_6$. These glazes are alleged to increase the life of silicon carbide heating elements 25–50% or more at 1100° C.

Epprecht et al teaches an oxidation resistant coating on carbon or silicon carbide incandescent bars which is first applied as molybdenum silicide and then oxidized at 1300°–1500° C. The bars can then be used at 1500° C. for longer periods than unprotected bars.

Two more protective coating are taught by the Schiavone and Newkirk et al patents. The former coats metal heater wires with a boron nitride coating; the latter protectively coats tungsten, carbon, graphite or molybdenum heating elements with a composition made up of aluminum, tungsten and a metal of the group indium, tin and gallium.

The Amberg reference listed above does not relate to a coating for a refractory article or heating elements. It is relevant for its teaching that the incorporation of silicon oxynitride in the mix used to form a resistance type heating element, enhances the oxidation resistance of the end product. According to Amberg 1% silicon nitride is blended with 94% 8 micron molybdenum disilicide powder and 5% bentonite; the mixture is then formed in the shape of an electrical resistance element and fired in hydrogen at 1200° C. and then air at 1500° C.

The present invention distinguishes over Amberg in that the latter has a small quantity of silicon oxynitride grains dispersed throughout the mass of the heating element, whereas the invention is a refractory article, including a heating element, with a silicon oxynitride (or silicon nitride) coating on the outer surfaces of the article with penetration of the coating to a depth greater than the depth of the external pores.

In 1974 the Applicant developed a silicon oxynitride protective coating. It was applied to silicon carbide heating elements and sold, by the assignee of the present invention, to customers who used them. The results were irratic. Some of the customers reported at 25–50% improvement in the useable life of the rods while others report no improvement or only a very marginal one. The coatings were applied in the form of a slurry of thru-200-mesh (74 microns and finer) type silicon oxynitride. Subsequently, the Applicant investigated this failure and found that the coating had spalled off of the heating elements thus allowing atmospheric attack directly on the silicon carbide. It was observed that the coating had not penetrated beyond the depth of the external or surface pores of the silicon carbide heating element and as a result was poorly attached to the latter.

SUMMARY OF THE INVENTION

Porous refractory articles coated with a strong, stable, protective coating of silicon nitride or silicon oxynitride provided by first coating preformed and sintered refractory shapes with a slurry of the nitride or oxynitride wherein the particles of nitride or oxynitride are smaller than the size of the pores in the refractory article. In slurry form, the fine nitride or oxynitride particles are carried deep into the surface of the refractory article well beyond the depth of the exposed surface pores, to a depth of ¼ inch (6.4 mm) or more. The coating is then preferably fired at about 1000° C. to harden the coating.

The resulting coating is permanently attached or bonded to the refractory article. Even if spalling should occur from any cause, the silicon oxynitride or silicon nitride imbedded in the pores of the refractory article cannot be removed thus continue to function as a protective barrier to any hostile environment in which the article is used.

DESCRIPTION OF THE PREFERRED EMBODIMENTS

In the following description of the preferred mode of practicing the present invention, silicon oxynitride is used as the protective coating. As implied above, this should not be construed as a limitation in that silicon nitride is also an effective protective coating. Similarly, while further discussion of the invention is specific to silicon carbide and heating elements, other refractory materials and articles are within the scope of the invention.

With respect to the particle size of the silicon oxynitride, the particle size per se is not a limiting factor. To practice the present invention, it is only required that the particle size of the silicon oxynitride be smaller than the pore size of the refractory substrate to which it is to be applied.

A silicon oxynitride coating slurry was prepared as follows:

A slurry was made up of 11 parts of silicon oxynitride having a particle size of about 2 microns and finer, 1 part of Darvan #7 (a sodium cation polyelectrolyte sold by R. T. Vanderbilt Company), and 5 parts of water. This mixture was blended until a smooth slip-like consistency was obtained. The consistency was measured in a Ford consistency cup with a 5/32" (~4 mm) orifice. The viscosity was such that the cup emptied in about 70 seconds.

Standard silicon carbide heating elements manufactured by Norton Company and having a minimum pore size of about 2.5 microns, were prepared for coating with the silicon oxynitride slurry. The elements were washed in tap water. This removed free graphite or carbon from the elements and dampened the elements for enhanced coating. The excess water was allowed to drain off by letting the elements stand at room temperature for an hour.

The heating elements were then completely coated with the earlier prepared slurry or slip of silicon oxynitride except for the terminal ends. The elements were allowed to air dry for about 3 hours. At this point a second coating of silicon oxynitride slip was applied to the element and dried in the same manner as the first coating. The coated elements were then dried at 70°-80° C. for about 4 hours and finally fired at 1000° C. for about an hour. The heating elements, at this point, were ready for use.

Heating elements were also coated with silicon nitride in the same manner.

The relative stability of the uncoated elements and elements coated with silicon oxynitride, and with silicon nitride was conspicuously apparent when all three types of heating elements were exposed to oxygen for 100 hours at 1400° C. The results were as follows:

| Coating | Wt. Gain (mg/cm$^2$) |
|---|---|
| none | 50 |
| $Si_3N_4$ | ~17 |
| $Si_2ON_2$ | ~17 |

The weight gain is a result of oxidation of the silica based material.

In end use tests, heating elements according to the instant invention were far superior to uncoated elements. In a glass melting operation at 1600° C. in air, the coated elements showed a 65% increase in useful life, over uncoated elements. In a phosphorous calcining process operated at 1260° C., the life of the coated elements was about 35% greater than uncoated elements. In an operation where lead zirconates were heated to 1370° C. in air and then cooled to 1090° C. in pure oxygen, silicon oxynitride coated heating elements according the invention showed a 100% increase in life over uncoated counterparts.

I claim:

1. A porous refractory article including a protective coating thereon, said coating being a material selected from the group consisting of silicon nitride, silicon oxynitride, and mixtures thereof, and wherein said coating has penetrated the porous refractory article to a depth greater than the depth of the surface pores therein.

2. The refractory article of claim 1 wherein the main body of said article is comprised of a nitride.

3. The refractory article of claim 1 wherein the main body of said article is comprised of a boride.

4. The refractory article of claim 1 wherein the main body of said article is comprised of a silicide.

5. The refractory article of claim 1 wherein the main body of said article is comprised of a carbide.

6. The refractory article of claim 5 wherein said carbide is silicon carbide and said article is a heating element.

* * * * *